(12) United States Patent
Pieters et al.

(10) Patent No.: US 8,148,467 B2
(45) Date of Patent: Apr. 3, 2012

(54) SILICONE-POLYMER-MODIFIED VULCANIZED-RUBBER COMPOSITIONS, PROCESSES FOR THEIR PRODUCTION, AND ALSO WINDSHIELD WIPERS ENCOMPASSING SAID MATERIAL

(75) Inventors: Eric Pieters, AK Simpelveld (NL); Yves Verburgh, Puurs (BE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 12/416,669

(22) Filed: Apr. 1, 2009

(65) Prior Publication Data

US 2009/0253866 A1 Oct. 8, 2009

(30) Foreign Application Priority Data

Apr. 4, 2008 (DE) .................. 10 2008 001 007

(51) Int. Cl.
C08L 83/06 (2006.01)
C08L 47/00 (2006.01)
A47L 1/00 (2006.01)
(52) U.S. Cl. ................. 525/101; 525/106; 15/103
(58) Field of Classification Search .............. None
See application file for complete search history.

(56) References Cited

U.S. PATENT DOCUMENTS

| | | | | |
|---|---|---|---|---|
| 3,631,183 A | | 12/1971 | Breslow | |
| 4,150,010 A | * | 4/1979 | Itoh et al. | 524/506 |
| 4,201,698 A | * | 5/1980 | Itoh et al. | 524/83 |
| 4,376,184 A | * | 3/1983 | Itoh et al. | 524/492 |
| 4,517,332 A | * | 5/1985 | Wada | 524/506 |
| 4,710,541 A | * | 12/1987 | Tomita et al. | 525/104 |
| 4,808,643 A | * | 2/1989 | Lemoine et al. | 524/87 |
| 4,977,200 A | * | 12/1990 | Itoh et al. | 523/223 |
| 4,981,899 A | * | 1/1991 | Nakamura et al. | 524/493 |
| 4,992,512 A | * | 2/1991 | Ward et al. | 525/100 |
| 5,039,725 A | * | 8/1991 | Nakamura et al. | 524/269 |
| 5,164,442 A | * | 11/1992 | Itoh et al. | 524/492 |
| 5,283,927 A | | 2/1994 | Gibbon et al. | |
| 5,314,752 A | * | 5/1994 | Bova et al. | 428/424.2 |
| 5,349,020 A | * | 9/1994 | Okada et al. | 525/237 |
| 6,013,715 A | * | 1/2000 | Gornowicz et al. | 524/492 |
| 6,147,160 A | * | 11/2000 | Wang et al. | 525/106 |
| 6,313,205 B1 | * | 11/2001 | Chiron et al. | 524/262 |
| 6,380,312 B1 | | 4/2002 | Maldonado | |
| 6,689,834 B2 | * | 2/2004 | Ackermann et al. | 524/493 |
| 6,864,315 B1 | * | 3/2005 | Hakuta et al. | 525/105 |
| 2002/0198299 A1 | * | 12/2002 | Matsunaga et al. | 524/262 |

FOREIGN PATENT DOCUMENTS

WO 02/096992 A2 12/2002
WO 03/078511 A1 9/2003

OTHER PUBLICATIONS

Gelest catalog, Reactive Silicones: Forging New Polymer Links, 2004, 64 pages.*

* cited by examiner

Primary Examiner — Robert Loewe
(74) Attorney, Agent, or Firm — Michael Best & Friedrich LLP

(57) ABSTRACT

A silicone-polymer-modified vulcanized-rubber composition based on unvulcanized rubber, characterized in that the composition can be produced by co-vulcanization from the following components:
A1) at least one vinyl-reactive polysiloxane component, and/or
A2) at least one mercapto-reactive polysiloxane component, and
B) at least one unsaturated vulcanizable unvulcanized-rubber component, and to a process for the production of said silicone-polymer-modified vulcanized-rubber composition based on unvulcanized rubber, and also to a windshield-wiper blade encompassing a silicone-polymer-modified vulcanized-rubber composition based on unvulcanized rubber.

14 Claims, No Drawings

SILICONE-POLYMER-MODIFIED VULCANIZED-RUBBER COMPOSITIONS, PROCESSES FOR THEIR PRODUCTION, AND ALSO WINDSHIELD WIPERS ENCOMPASSING SAID MATERIAL

BACKGROUND OF THE INVENTION

The present invention relates to a silicone-polymer-modified vulcanized-rubber composition not based on silicone elastomer, for example for the production of windshield wipers. The present invention also relates to a process for the production of said vulcanized-rubber compositions, and also to a windshield wiper with wiper blades.

Elastomers and vulcanized-rubber mixtures are in particular divided into silicone-based and non-silicone-based compositions.

Among the known vulcanized-rubber compositions not based on silicone elastomer, for example for the production of windshield wipers, are inter alia vulcanizable formulations which comprise natural mixtures, an example being unvulcanized rubber, or synthetic mixtures, examples being polychloroprene or unvulcanized ethylene-propylene-diene rubber (EPDM) and ethylene-propylene rubber (EPM), and also mixtures of these. Other materials used for wiper blades are silicone-based elastomer compositions, the aim being to achieve improvements in the sealing with respect to the windshield, and improvements in resistance to temperature change. Examples of compositions used hitherto are disclosed inter alia in U.S. Pat. No. 5,283,927 or in international patent application WO 02/096992. However, a feature common to these compositions, with respect to their formability and processability, is that, in order to achieve adequate processing properties and mechanical stability, they have to be provided with specific reinforcing fillers and extender additives. Examples of these structurally reinforcing fillers are calcined or precipitated quartz and amorphous silica, and examples of suitable extender additives are ground quartz and celites or limestone-containing particles. However, specifically the use of extender additives has some attendant disadvantages with respect to rapid wear on the extruder machinery, impairment of water-repellent properties of wiper blades produced from said compositions, and reduced long-term stability.

In addition, the known silicone-based vulcanized-rubber compositions need a markedly longer vulcanization time in comparison with the vulcanization times exhibited by extruded or injection-molded non-silicone-based vulcanized-rubber mixtures based, for example, on unvulcanized natural rubber, unvulcanized chloroprene rubber, EPDM, EPM, or mixtures of these.

SUMMARY OF THE INVENTION

The silicone-polymer-modified vulcanized-rubber composition of the invention Has the advantage over the prior art that it is possible to obtain vulcanized-rubber compositions with improved resistance to temperature change and with improved long-term stability, and also with improved sealing with respect to the windshield.

Another advantage is that the silicone-polymer-modified vulcanized-rubber composition exhibits not only very good processability in the injection-molding process and in the extrusion process but also low vulcanization times, when comparison is made with entirely silicone-based mixtures.

It has been found that the addition of either a vinyl-terminated polysiloxane component A1) or a mercapto-reactive polysiloxane component A2) to an unvulcanized non-silicone-based rubber B) improves flexibility of the resultant hydrophobic wiper blades of windshield wipers at low temperatures, while a simultaneous improvement can be obtained in the following properties at high temperatures: resistance to temperature change and long-term stability. The component of type A) acts here as a crosslinking agent during the vulcanization of the vulcanized-rubber component B).

It has also been found that the vinyl- or mercapto-reactive siloxane components A1 and A2 act as internal reactive lubricants, so that no polydimethylsiloxane in the form of film is transferred to the windshield from the resultant wiper blades. At the same time, the coefficient of friction of the wiper blades is lowered, and this leads to less abrasion and stuttering of the wiper blades on hydrophobic and hydrophilic windshields.

The present invention therefore provides a silicone-polymer-modified vulcanized-rubber composition based on unvulcanized rubber, characterized in that the composition can be produced by co-vulcanization from the following components:

A1) at least one vinyl-reactive polysiloxane component, and/ or
A2) at least one mercapto-reactive polysiloxane component, and
B) at least one unsaturated vulcanizable unvulcanized-rubber component.

The invention uses, for the production of a silicone-polymer-modified vulcanized-rubber composition based on unvulcanized rubber, a component B) based on an unvulcanized-rubber material.

For the purposes of the present invention, an unvulcanized-rubber material, in addition to unvulcanized natural rubber, also includes all conceivable synthetic unvulcanized-rubber mixtures. (component B) in particular can be selected from the group of unvulcanized natural rubber, polychloropropene, EPDM, EPM and any desired mixtures thereof.

For the purposes of the invention, the terms "vinyl-reactive" and "mercapto-reactive" mean that at least one free vinyl group or mercapto group is provided in the molecule for a crosslinking reaction. The position of the reactive vinyl or mercapto group within the molecule is not critical and can be either terminal or at a branching point, or on the main chain of the polymer.

For the purposes of one preferred embodiment, the vinyl-reactive polysiloxane component A1) can have been selected from the group of the vinyldimethyl-terminated polydimethylsiloxanes, the vinylmethylsiloxane-polydimethyl-siloxane copolymers, the alkyldimethyl-terminated poly-dimethylsiloxanes, the vinyl-terminated dimethyldiphenyl-siloxane copolymers, and the branched polydimethylsiloxanes having a vinyl group at the branching point.

The weight-average molecular weight of the polysiloxane component A1) can preferably be from 200 to 310 000, with preference from 28 000 to 120 000.

It is thus possible for the polysiloxane component A1) to act like an internal lubricant, and that smearing on the windshield caused by polysiloxane polymer dissolved out of the wiper blade is actively prevented. By virtue of the internal lubricant action, it is also possible to suppress undesired stuttering of wiper blades produced from the composition of the invention.

For the purposes of another preferred embodiment, the mercapto-reactive polysiloxane component A2) can have been selected from the group of the polydimethylsiloxane-methylmercaptopropylsiloxane copolymers, the branched polydimethylsiloxanes having a mercapto group at the branching points, and the mercaptoalkyl-terminated polydimethylsiloxanes.

The weight-average molecular weight of the mercapto-reactive polysiloxane component A2) can preferably be from 3000 to 28 000, preferably from 5000 to 10 000.

It is thus possible for the polysiloxane component A2) to act like an internal lubricant, and that smearing on the windshield caused by polysiloxane polymer dissolved out of the wiper blade is actively prevented. By virtue of the internal lubricant action, it is also possible to suppress undesired stuttering of wiper blades produced from the composition of the invention.

In another preferred embodiment of the present invention, it is possible that the vinyl-reactive component A1) and/or the mercapto-reactive component A2) is used in a ratio by weight with respect to component B) which is from 1:100 to 20:100, preferably 2:100 to 10:100, and particularly preferably from 3:100 to 7:100.

A good balance is thus achieved between the improved resistance to temperature change and long-term durability of the resultant vulcanized-rubber composition with the internal lubrication properties and with good processability.

The present invention further provides a process for the production of a silicone-polymer-modified vulcanized-rubber composition based on unvulcanized rubber, in which the following components
A1) at least one vinyl-reactive polysiloxane component, and/or
A2) at least one mercapto-reactive polysiloxane component, and
B) at least one unsaturated vulcanizable unvulcanized-rubber component
are mixed with one another and are vulcanized together.

A preferred possibility is that the vinyl-reactive component A1) and/or the mercapto-reactive component A2) is used in a ratio by weight with respect to component B) which is from 1:100 to 20:100, preferably 2:100 to 10:100, and particularly preferably from 3:100 to 7:100.

For further processing of a silicone-polymer-modified vulcanized-rubber composition of the invention, based on unvulcanized rubber, this can be extruded or injection-molded, and then vulcanized.

It is thus advantageously possible by way of example to produce wiper blades for windshield wipers whose vulcanization times are markedly smaller when comparison is made with known, silicone-based vulcanized-rubber mixtures.

The present invention further provides a windshield-wiper blade, characterized in that it encompasses a wiper blade composed of a silicone-polymer-modified vulcanized-rubber composition of the invention, based on unvulcanized rubber, or encompasses a silicone-polymer-modified vulcanized-rubber composition produced in accordance with the invention, and based on unvulcanized rubber.

The present invention further provides the use of the silicone-polymer-modified vulcanized-rubber composition of the invention, based on unvulcanized rubber, or of the silicone-polymer-modified vulcanized-rubber composition produced in accordance with the invention, and based on unvulcanized rubber, for the production of windshield wipers, in particular in the motor vehicle industry.

WORKING EXAMPLES

Production Method:

The proportions stated in the respective table of the components were mixed and homogenized using a kneader, in a mixing container. The mixture was then vulcanized at a temperature of from 100 to 250° C. for a period of from 1 to 10 minutes.

PS 255 is a trade name of United Chemical Technologies for a vulcanized poly(dimethylsiloxane)-(0.1-0.3%) (methylvinylsiloxane) copolymer rubber with high molecular weight.

PS 405 is a trade name of United Chemical Technologies for a branched polydimethylsiloxane having a mercaptopropyl group at the branching points.

PS 424 is a trade name of United Chemical Technologies for a vulcanized poly(dimethylsiloxane)-(7.5%) (methylvinylsiloxane) copolymer rubber with low molecular weight.

PS 445 is a trade name of United Chemical Technologies for a vinyl-terminated dimethylpolysiloxane with low molecular weight.

PS 849 is a trade name of United Chemical Technologies for a poly(dimethylsiloxane)-(1-3%)(methyl-mercaptopropylsiloxane) copolymer.

Examples 1-8

In each case a vulcanized rubber composition was mixed and vulcanized, using the components, and their proportions by weight, listed in the tables below:

| | Example No. | |
|---|---|---|
| | 1 | 2 |
| Component | Proportion by weight | Proportion by weight |
| Polychloroprene | 100 | 100 |
| PS 445 | 5 | 2.5 |
| Magnesium oxide | 4 | 4 |
| Octylated diphenylamine | 2 | 2 |
| Mixture composed of metal soaps, fatty acid esters, and derivatives | 2 | 1 |
| Mixture composed of fatty acids, fatty alcohols, fatty acid esters, and lubricants | | 1.5 |
| Stearic acid | 1 | 1.5 |
| Calcium oxide | | 5 |
| Carbon black | 68 | 70 |
| Dioctyl sebacate | | 15 |
| Mixture composed of aliphatic and aromatic esters | 15 | |
| ZnO | 5 | 5 |
| Dicatechol borate | | 2.5 |
| Polyethylene wax | 1 | |
| Dimethylammonium hydrogen isophthalate | 2 | |

| | Example No. | |
|---|---|---|
| | 3 | 4 |
| Component | Proportion by weight | Proportion by weight |
| Unvulcanized natural rubber | 100 | 100 |
| PS 445 | 3 | 6 |
| Masticating agent | 0.25 | 0.25 |
| 2,2,4-Trimethyl-1,2-dihydroquinoline (polymerized) | 2 | 1 |
| N-isopropyl-N'-phenyl-p-phenylenediamine | 2 | |
| N-(1,3-dimethylbutyl)-N'-p-phenylenediamine | | 2 |
| Paraffin wax | 1.5 | 1 |
| Calcium oxide | | 5 |
| Mixture composed of metal soaps, fatty acid esters, and derivatives | 2 | |
| Mixture composed of fatty alcohols, fatty acid esters, and derivatives | | 2.5 |

|  | |  |
|---|---|---|
| Mixture composed of aliphatic and (unsaturated) aromatic hydrocarbons | 2 |  |
| Stearic acid | 1 | 1.5 |
| Carbon black | 65 | 75 |
| Paraffinic plasticizer | 12 |  |
| Naphthenic plasticizer |  | 15 |
| Sulfur | 2 | 2 |
| ZnO | 5 | 5 |
| N-cyclohexyl-2-benzothiazylsulfenamide | 1.5 |  |
| N'-tert-butyl-2-benzothiazole sulfenamide |  | 1 |
| Tetramethylthiuram disulfide |  | 0.3 |

| | Example No. | |
|---|---|---|
| | 5 | 6 |
| Component | Proportions by weight | Proportions by weight |
| EPDM | 50 | 60 |
| EPM | 50 | 40 |
| PS 445 | 8 | 3 |
| PS 424 |  | 3 |
| 2,2,4-Trimethyl-1,2-dihydroquinoline (polymerized) | 1 | 1.5 |
| Calcium oxide |  | 5 |
| Mixture composed of metal soaps, fatty acid esters, and derivatives |  | 1.5 |
| Polyethylene glycol |  | 2 |
| Stearic acid | 1 | 1 |
| Carbon black | 80 | 90 |
| Paraffinic plasticizer |  | 25 |
| Diisooctyl adipate (DIOA) | 15 |  |
| Dicumyl peroxide |  | 5.5 |
| Trimethylolpropane trimethacrylate | 3 | 2.5 |

|  |  |
|---|---|
| 1,3-1,4-bis(tert-Butylperoxy-isopropyl)benzene | 5 |
| Retarder for peroxide vulcanization | 0.25 |

| | Example No. | |
|---|---|---|
| | 7 | 8 |
| Component | Proportions by weight | Proportions by weight |
| Unvulcanized natural rubber | 50 | 60 |
| EPDM | 50 | 40 |
| PS 445 | 2.5 |  |
| PS 424 |  | 1.5 |
| PS 255 | 2.5 | 4.5 |
| 2,2,4-Trimethyl-1,2-dihydroquinoline (polymerized) | 1 | 2 |
| Calcium oxide |  | 5 |
| Polyethylene glycol |  | 4 |
| Stearic acid | 1 | 1 |
| Carbon black | 55 | 85 |
| Paraffinic plasticizer |  | 10 |
| Polybutene | 10 | 10 |
| Trimethylolpropane trimethacrylate | 3 | 2.5 |
| Dicumyl peroxide |  | 5 |
| 1,3-1,4-bis(tert-Butylperoxy-isopropyl)benzene | 5 |  |
| Retarder for peroxide vulcanization | 0.25 |  |

The resultant extruded vulcanized-rubber composition in the form of a continuous wiper blade was then conveyed through a liquefied salt bath for vulcanization at about 220° C., using a residence time of from 30 seconds to 3 minutes.

Examples 9-16

In each case a vulcanized rubber composition was mixed and vulcanized, using the components, and their proportions by weight, listed in the tables below, in a kneader:

| | Example No. | |
|---|---|---|
| | 9 | 10 |
| Component | Proportions by weight | Proportions by weight |
| Unvulcanized natural rubber | 70 | 50 |
| Polychloropropene | 30 | 50 |
| PS 405 | 3 | 7 |
| Masticating agent | 0.25 |  |
| N-isopropyl-N'-phenyl-p-phenylenediamine | 2 |  |
| Calcium oxide |  | 5 |
| Polyethylene glycol | 2 |  |
| Mixture composed of metal soaps, fatty acid esters, and derivatives |  | 2 |
| Mixture composed of metal soaps, fatty alcohols, fatty acid esters, and derivatives | 2 |  |
| Mixture composed of aliphatic and (unsaturated) aromatic hydrocarbons |  | 2 |
| Stearic acid | 1 | 1.5 |
| Carbon black | 70 | 85 |
| Ester plasticizer |  | 8 |
| Aromatic plasticizer | 12 |  |
| Dioctyl sebacate |  | 8 |
| Sulfur |  | 1.5 |
| Tetramethylthiuram disulfide | 1 |  |
| Ethylenethiourea | 1.5 |  |
| Di-ortho-tolylguanidine |  | 1.5 |
| Tetramethylthiuram monosulfide |  | 1 |
| Caprolactam disulfide |  | 1 |

-continued

| Component | Example No. 11 Proportions by weight | Example No. 12 Proportions by weight | Example No. 13 Proportions by weight | Example No. 14 Proportions by weight |
|---|---|---|---|---|
| EPDM | 100 | 100 | 70 | 50 |
| EPM | | | 30 | |
| Unvulcanized natural rubber | | | | 50 |
| PS 424 | 3 | 5 | 7 | 5.5 |
| PS 405 | | | 2.5 | 6 |
| 2,2,4-Trimethyl-1,2-dihydroquinoline (polymerized) | 2 | 1 | 1 | 1 |
| Calcium oxide | | 5 | 5 | |
| Mixture composed of metal soaps, fatty acid esters, and derivatives | 3 | | | |
| Mixture composed of fatty alcohols, fatty acid esters, and derivatives | | | 1.5 | 2 |
| Polyethylene glycol | | 3 | | |
| Stearic acid | 1 | 1 | 1 | 1 |
| Carbon black | 80 | 90 | 75 | 75 |
| Paraffinic plasticizer | | 25 | 28 | |
| Naphthenic plasticizer | 25 | | | 20 |
| ZnO | 5 | | | |
| Sulfur | 1.2 | | | |
| 2-Mercaptobenzothiazole | 1.8 | | | |
| Tetramethylthiuram disulfide | 0.8 | | | |
| Dipentamethylenethiuram tetrasulfide | 1.6 | | | |
| Trimethylolpropane trimethacrylate | | 2 | 3 | |
| Dicumyl peroxide | | 4.5 | | |
| 1,3-1,4-bis(tert-Butyl-peroxyisopropyl)benzene | | | 5 | 4 |
| N,N'-m-Phenylene-dimaleimide | | | 1 | 1.2 |

| Component | Example No. 15 Proportions by weight | Example No. 16 Proportions by weight |
|---|---|---|
| Unvulcanized natural rubber | 40 | 40 |
| EPDM | 60 | 60 |
| PS 405 | 4 | |
| PS 445 | | 4 |
| PS 255 | | 3 |
| 2,2,4-Trimethyl-1,2-dihydroquinoline (polymerized) | 2 | 2 |
| Calcium oxide | | 5 |
| Mixture composed of metal soaps, fatty acid esters, and derivatives | 1 | |
| Polyethylene glycol | 3 | |
| Stearic acid | 1.5 | 1.5 |
| Carbon black | 80 | 90 |
| Paraffinic plasticizer | 15 | 25 |
| Naphthenic plasticizer | 15 | |
| Sulfur | 1.5 | |
| ZnO | 5 | |
| 2-Mercaptobenzothiazole | 1.5 | |
| Tetramethylthiuram disulfide | 0.8 | |
| Dipentamethylenethiuram tetrasulfide | 1.2 | |
| Trimethylolpropane trimethacrylate | | 2.5 |
| Dicumyl peroxide | | 4 |

The resultant extruded vulcanized-rubber composition in the form of a continuous wiper blade was then conveyed through a liquefied salt bath for vulcanization at about 220° C., using a residence time of from 30 seconds to 35 minutes.

Examples 17-24

In each case a vulcanized rubber composition was mixed and vulcanized, using the components, and their proportions by weight, listed in the tables below, in a kneader:

|  | Example No. | | | |
|---|---|---|---|---|
| Component | 17 Proportions by weight | 18 Proportions by weight | 19 Proportions by weight | 20 Proportions by weight |
| EPDM | 50 | 100 | 100 | 100 |
| EPM | 50 | | | |
| PS 255 | | 6 | 5 | |
| PS 445 | 5 | 3 | 8 | 4 |
| 2,2,4-Trimethyl-1,2-dihydroquinoline (polymerized) | | | | 2 |
| 4,4'-bis(α-Dimethyl-benzyl)diphenylamine | 2 | 2 | | |
| Zinc salt of 4- and 5-methyl-2-mercapto-benzimidazole | | 2 | | |
| Calcium oxide | | 5 | | 5 |
| Mixture composed of aliphatic and aromatic hydrocarbons | | | | 1.5 |
| Polyethylene glycol | | 3 | 2.5 | |
| Stearic acid | 1 | 1 | 1 | 1 |
| Carbon black | 60 | 90 | 75 | 55 |
| Paraffinic plasticizer | | 25 | | |
| Polyether plasticizer | 12 | | | |
| Ester plasticizer | | | | 12 |
| Dioctyl sebacate (DOS) | | | 15 | |
| Trimethylolpropane trimethacrylate | | 2 | 3 | 2.5 |
| N,N'-m-Phenylene-dimaleimide | 1 | | | |
| 2,5-Dimethyl-2,5-di(tert-butylperoxy)hexane | | 5 | | |
| Dicumyl peroxide | | | | 4 |
| 1,3-1,4-bis(tert-Butyl-peroxyisopropyl)benzene | 4.5 | | 5 | |
| Retarder for peroxide vulcanization | | 0.25 | 0.25 | |

|  | Example No. | | | |
|---|---|---|---|---|
| Component | 21 Proportions by weight | 22 Proportions by weight | 23 Proportions by weight | 24 Proportions by weight |
| Unvulcanized natural rubber | 100 | 100 | 60 | 50 |
| Unvulcanized polychloroprene rubber | | | 40 | 50 |
| PS 849 | 4 | 3 | 2.5 | 4.5 |
| Masticating agent | | 0.25 | 0.25 | |
| 2,2,4-Trimethyl-1,2-dihydroquinoline (polymerized) | 2 | 1 | | 2 |
| N-isopropyl-N'-phenyl-p-phenylenediamine | 2 | | | 2 |
| N-(1,3-dimethylbutyl)-N'-p-phenylenediamine | | 2 | | |
| Paraffin wax | 1 | 1.5 | | |
| Calcium oxide | | 5 | | 5 |
| Mixture composed of fatty alcohols, fatty acid esters, and derivatives | 2 | 2 | | |
| Mixture composed of metal soaps, fatty alcohols, | | | 2.5 | 2 |

-continued

| Component | | | | |
|---|---|---|---|---|
| fatty acid esters, and derivatives | | | | |
| Mixture composed of aliphatic and aromatic hydrocarbons | | | 2 | |
| Stearic acid | 1 | 1 | 1 | 1 |
| Carbon black | 85 | 55 | 70 | 60 |
| Paraffinic plasticizers | 8 | | | |
| Naphthenic plasticizers | 8 | | | |
| Ester plasticizers | | | 12 | |
| Aromatic plasticizers | | 12 | | |
| Dioctyl sebacate | | | | 10 |
| Sulfur | 1.5 | 2 | | 1.5 |
| ZnO | 5 | 5 | | |
| 2-Mercaptobenzothiazole | | 1.5 | | |
| Benzothiazyl disulfide | 1 | | | |
| Tetramethylthiuram disulfide | | 0.3 | 1 | |
| Ethylenethiourea | | | 1.5 | |
| di-ortho-Tolylguanidine | | | | 1.5 |
| Tetramethylthiuram monosulfide | | | | 1 |
| 4,4'-Dithiodimorpholine | | | | 1 |

The resultant extruded vulcanized-rubber composition in the form of a continuous wiper blade was then conveyed through a liquefied salt bath for vulcanization at about 220° C., using a residence time of from 30 seconds to 3 minutes.

Examples 25-32

In each case a vulcanized rubber composition was mixed and vulcanized, using the components, and their proportions by weight, listed in the tables below, in a kneader:

| | Example No. | |
|---|---|---|
| | 25 | 26 |
| Component | Proportions by weight | Proportions by weight |
| Unvulcanized polychloroprene rubber | 100 | 100 |
| PS 849 | 2 | 4 |
| Magnesium oxide | 4 | 4 |
| Octylated diphenylamine | 2 | 2 |
| Polyethylene wax | | 1 |
| Calcium oxide | | 5 |
| Mixture composed of metal soaps, fatty acid esters, and derivatives | 2 | |
| Mixture composed of metal salts of (un)saturated fatty acids and amide esters | | 1.5 |
| Stearic acid | 1 | 1.5 |
| Carbon black | 58 | 75 |
| Ester plasticizers | 8 | |
| Aromatic plasticizers | | 12 |
| Sulfur | | 0.75 |
| ZnO | 5 | 5 |
| Tetramethylthiuram disulfide | 1 | |
| N,N'-m-Phenylenedimaleimide | | 1 |
| Benzothiazyl disulfide | | 1 |

| | Example No. | |
|---|---|---|
| | 27 | 28 |
| Component | Proportions by weight | Proportions by weight |
| Unvulcanized polychloroprene rubber | 100 | 100 |
| PS 405 | 3 | 6 |
| Magnesium oxide | 4 | 4 |
| Octylated diphenylamine | 2 | 2 |

-continued

| Component | | |
|---|---|---|
| Mixture composed of fatty acids, fatty alcohols, fatty acid esters, and lubricant | 2 | |
| Mixture composed of metal salts of (un)saturated fatty acids and amide esters | 1 | 2.5 |
| Calcium oxide | | 5 |
| Stearic acid | 1 | 1 |
| Carbon black | 54 | 65 |
| Polyether plasticizers | 8 | |
| Ester plasticizers | | 15 |
| Sulfur | 1.5 | |
| ZnO | 5 | 5 |
| di-ortho-Tolylguanidine | 1.5 | |
| Tetramethylthiuram disulfide | 1 | |
| 2-Methyl-2-thiazolidine | | 2 |

| | Example No. | |
|---|---|---|
| | 29 | 30 |
| Component | Proportions by weight | Proportions by weight |
| Unvulcanized natural rubber | 100 | 100 |
| PS 405 | 2.5 | 5 |
| Masticating agent | 0.5 | 0.5 |
| Calcium oxide | | 5 |
| 2,2,4-Trimethyl-1,2-dihydroquinoline (polymerized) | 2 | 3 |
| N-isopropyl-N'-phenyl-p-phenylenediamine | 2 | |
| N-(1,3-Dimethylbutyl)-N'-phenyl-p-phenylenediamine | | 2 |
| Paraffin wax | 1.5 | 1 |
| Mixture composed of fatty alcohols, fatty acid esters, and derivatives | 3 | |
| Mixture composed of metal soaps, fatty acid esters, and lubricant | | 3 |
| Stearic acid | 1 | 1.5 |
| Carbon black | 65 | 75 |
| Paraffinic plasticizers | 12 | |
| Naphthenic plasticizers | | 15 |
| Sulfur | 2 | 2 |
| ZnO | 5 | 5 |
| N-cyclohexyl-2-benzothiazylsulfenamide | 1.5 | |
| N-tert-butyl-2-benzothiazylsulfenamide | | 1 |
| Tetramethylthiuram disulfide | | 0.3 |

-continued

| Component | Example No. 31 Proportions by weight | Example No. 32 Proportions by weight |
|---|---|---|
| Unvulcanized natural rubber | 100 | 100 |
| PS 405 | 3 | 2 |
| PS 849 | 1.5 | 5 |
| Masticating agent | | 0.25 |
| 2,2,4-Trimethyl-1,2-dihydroquinoline (polymerized) | 2 | 1 |
| N-isopropyl-N'-phenyl-p-phenylenediamine | 2 | |
| N-(1,3-Dimethylbutyl)-N'-phenyl-p-phenylenediamine | | 2 |
| Paraffin wax | 1 | 1.5 |
| Calcium oxide | | 5 |
| Polyethylene glycol | 1 | |
| Mixture composed of metal soaps, fatty acid esters, and derivatives | 2.5 | |
| Mixture composed of fatty alcohols, fatty acid esters, and derivatives | | 2 |
| Mixture composed of aliphatic and (unsaturated) aromatic hydrocarbons | | 2 |
| Stearic acid | 1 | 1.5 |
| Carbon black | 70 | 55 |
| Polyether plasticizers | | 12 |
| Ester plasticizers | 12 | |
| Sulfur | 1.5 | 2 |
| ZnO | 5 | 5 |
| 2-Mercaptobenzothiazole | | 1.5 |
| Benzothiazyl disulfide | 1 | |
| Tetramethylthiuram disulfide | | 0.3 |
| Caprolactam disulfide | 1 | |

The resultant extruded vulcanized-rubber composition in the form of a continuous wiper blade was then conveyed through a liquefied salt bath for vulcanization at about 220° C., using a residence time of from 30 seconds to 3 minutes.

Examples 33-38

In each case a vulcanized rubber composition was mixed and vulcanized, using the components, and their proportions by weight, listed in the tables below, in a kneader:

| Component | Example No. 33 Proportion by weight | Example No. 34 Proportion by weight |
|---|---|---|
| EPDM | 100 | 100 |
| PS 849 | 2.5 | 5 |
| 2,2,4-Trimethyl-1,2-dihydroquinoline (polymerized) | 1 | |
| Calcium oxide | 5 | 5 |
| Mixture composed of aliphatic and aromatic hydrocarbons | | 2 |
| Stearic acid | 1.5 | |
| Carbon black | 55 | 55 |
| Naphthenic plasticizers | | 20 |
| Ester plasticizers | 15 | |
| Sulfur | 1.5 | |
| ZnO | 5 | |
| 2-Mercaptobenzothiazole | 1.25 | |
| Tetramethylthiuram disulfide | 0.7 | |
| Dipentamethylenethiuram tetrasulfide | 1.25 | |
| Trimethylolpropane trimethacrylate | | 3 |
| 2,5-Dimethyl-2,5-di(tert-butylperoxy-isopropyl)hexane | | 4.5 |
| Retarder for peroxide vulcanization | | 0.25 |

| Component | Example No. 35 Proportion by weight | Example No. 36 Proportion by weight |
|---|---|---|
| EPDM | 100 | 100 |
| PS 405 | 3 | 7 |
| 2,2,4-Trimethyl-1,2-dihydroquinoline (polymerized) | 2 | |
| Calcium oxide | | 5 |
| Mixture composed of metal soaps, fatty acid esters, and derivatives | 2 | |
| Mixture composed of fatty alcohols, fatty acid esters, and derivatives | | 2.5 |
| Stearic acid | 1 | 1 |
| Carbon black | 80 | 90 |
| Paraffinic plasticizers | 25 | 15 |
| Naphthenic plasticizers | | 15 |
| Sulfur | 1 | 1.25 |
| ZnO | 5 | 5 |
| 2-Mercaptobenzothiazole | 1.5 | 1.6 |
| Tetramethylthiuram disulfide | 0.8 | 0.75 |
| Dipentamethylenethiuram tetrasulfide | 1.5 | 1.6 |

| Component | Example No. 37 Proportion by weight | Example No. 38 Proportion by weight |
|---|---|---|
| Unvulcanized natural rubber | | 30 |
| EPDM | 100 | 40 |
| EPM | | 30 |
| PS 255 | 6 | 6 |
| PS 445 | | 7 |
| Zinc salt of 4- and 5-methyl-2-mercaptobenzimidazole | 1 | |
| 4,4'-bis(α-Dimethylbenzyl)diphenylamine | 2 | |
| 2,2,4-Trimethyl-1,2-dihydroquinoline (polymerized) | | 1 |
| Calcium oxide | 5 | 5 |
| Mixture composed of aliphatic and aromatic hydrocarbons | 1 | 3 |
| Stearic acid | 1 | 1 |
| Carbon black | 60 | 60 |
| Polyether plasticizers | | 15 |
| Ester plasticizers | 15 | |
| Trimethylolpropane trimethacrylate | 2 | 2 |
| 2,5-Dimethyl-2,5-di(tert-butyl-peroxy)hexane | 4 | 4 |
| Retarder for peroxide vulcanization | 0.25 | 0.25 |

The resultant extruded vulcanized-rubber composition in the form of a continuous wiper blade was then conveyed through a liquefied salt bath for vulcanization at about 220° C., using a residence time of from 30 seconds to 3 minutes.

The invention claimed is:

1. A silicone-polymer-modified vulcanized-rubber composition based on unvulcanized rubber, characterized in that the composition is produced by co-vulcanization from the following components:
   A1) at least one vinyl-reactive polysiloxane component;
   A2) at least one mercapto-reactive polysiloxane component, and
   B) at least one unsaturated vulcanizable unvulcanized-rubber component,
wherein the weight-average molecular weight of the mercapto-reactive polysiloxane component A2) is from 3000 to 28 000 and wherein the vinyl-reactive polysiloxane component A1) has been selected from the group consisting of vinyldimethyl-terminated polydimethylsiloxanes, vinylmethylsiloxane-polydimethyl-siloxane copolymers, alkyldimethyl-terminated polydimethylsiloxanes, vinyl-terminated dimethyldiphenyl-siloxane copolymers, and branched polydimethylsiloxanes having a vinyl group at the branching point.

2. A silicone-polymer-modified vulcanized-rubber composition according to claim 1, characterized in that component B) has been selected from the group of natural unvulcanized rubber, polychloropropene, EPDM, EPM, and mixtures thereof.

3. A silicone-polymer-modified vulcanized-rubber composition according to claim 1, characterized in that the mercapto-reactive polysiloxane component A2) has been selected from the group consisting of polydimethylsiloxane-methylmercaptopropylsiloxane copolymers, branched polydimethylsiloxanes having a mercapto group at the branching points, and mercaptoalkyl-terminated polydimethylsiloxanes.

4. A silicone-polymer-modified vulcanized-rubber composition according to claim 1, characterized in that the weight-average molecular weight of the mercapto-reactive polysiloxane component A2) is from 5000 to 10 000.

5. A silicone-polymer-modified vulcanized-rubber composition according to claim 1, characterized in that the mercapto-reactive component A2) is used in a ratio by weight with respect to component B) which is from 1:100 to 20:100.

6. A silicone-polymer-modified vulcanized-rubber composition according to claim 1, characterized in that the weight-average molecular weight of the polysiloxane component A1) is from 200 to 310 000.

7. A silicone-polymer-modified vulcanized-rubber composition according to claim 6, characterized in that the mercapto-reactive polysiloxane component A2) has been selected from the group consisting of polydimethylsiloxane-methylmercaptopropylsiloxane copolymers, branched polydimethylsiloxanes having a mercapto group at the branching points, and mercaptoalkyl-terminated polydimethylsiloxanes.

8. A silicone-polymer-modified vulcanized-rubber composition according to claim 7, characterized in that the weight-average molecular weight of the mercapto-reactive polysiloxane component A2) is from 5000 to 10 000.

9. A silicone-polymer-modified vulcanized-rubber composition according to claim 7, characterized in that the vinyl-reactive component A1) and/or the mercapto-reactive component A2) is used in a ratio by weight with respect to component B) which is from 1:100 to 20:100.

10. The silicone-polymer-modified vulcanized-rubber composition according to claim 7, wherein the vinyl-reactive component A1) and/or the mercapto-reactive component A2) is used in a ratio by weight with respect to component B) which is from 3:100 to 7:100.

11. The silicone-polymer-modified vulcanized-rubber composition according to claim 1, wherein the vinyl-reactive component A1) is used in a ratio by weight with respect to component B) which is from 1:100 to 20:100.

12. The silicone-polymer-modified vulcanized-rubber composition according to claim 1, wherein the vinyl-reactive component A1) is used in a ratio by weight with respect to component B) which is from 3:100 to 7:100.

13. The silicone-polymer-modified vulcanized-rubber composition according to claim 1, wherein the mercapto-reactive component A2) is used in a ratio by weight with respect to component B) which is from 3:100 to 7:100.

14. The silicone-polymer-modified vulcanized-rubber composition according to claim 1, wherein the weight-average molecular weight of the polysiloxane component A1) is from 28 000 to 120 000.

* * * * *